United States Patent
Lee et al.

(10) Patent No.: US 10,328,763 B2
(45) Date of Patent: Jun. 25, 2019

(54) VEHICLE SUSPENSION APPARATUS CAPABLE OF ADJUSTING VEHICLE HEIGHT

(71) Applicants: Hyundai Motor Company, Seoul (KR); Kia Motors Corporation, Seoul (KR)

(72) Inventors: Sang Hoon Lee, Yongin-si (KR); Chang Sin Lee, Seoul (KR); Youn Hyung Cho, Seoul (KR)

(73) Assignees: Hyundai Motor Company, Seoul (KR); Kia Motor Company, Seoul (KR)

( * ) Notice: Subject to any disclaimer, the term of this patent is extended or adjusted under 35 U.S.C. 154(b) by 85 days.

(21) Appl. No.: 15/633,406

(22) Filed: Jun. 26, 2017

(65) Prior Publication Data
US 2018/0170140 A1 Jun. 21, 2018

(30) Foreign Application Priority Data
Dec. 15, 2016 (KR) ........................ 10-2016-0171852

(51) Int. Cl.
*B60G 17/016* (2006.01)
*B60G 17/0165* (2006.01)
(Continued)

(52) U.S. Cl.
CPC .......... *B60G 17/0165* (2013.01); *B60G 11/14* (2013.01); *B60G 13/005* (2013.01);
(Continued)

(58) Field of Classification Search
CPC .. B60G 17/0165; B60G 11/14; B60G 13/005; B60G 13/04; B60G 15/04; B60G 17/016;
(Continued)

(56) References Cited

U.S. PATENT DOCUMENTS 4,372,545 A * 2/1983 Federspiel ........... B60G 15/061
  137/854
5,954,318 A * 9/1999 Kluhsman .............. B60G 11/16
  267/175
(Continued)

FOREIGN PATENT DOCUMENTS

CN 106799947 A * 6/2017
GB 2412136 A * 9/2005 .............. E01F 9/654
KR 10-2005-0120948 A 12/2005

*Primary Examiner* — Faye M Fleming
(74) *Attorney, Agent, or Firm* — Morgan, Lewis & Bockius LLP

(57) ABSTRACT

A suspension apparatus may include an internal cylinder having fixing grooves, an intermediate cylinder rotatably provided around the internal cylinder to allow a shock-absorber to be moved up and down, and having connection holes, an external cylinder rotatably provided around the intermediate cylinder and having locking pins to be inserted into the fixing grooves through the connection holes such that the locking pins are decoupled from the fixing grooves, but remain inserted into the connection holes, and a driving device connected to the external cylinder to rotate the intermediate cylinder to allow the shock-absorber to be moved up and down, adjusting a height of a vehicle body.

8 Claims, 5 Drawing Sheets

(51) Int. Cl.
*B60G 17/02* (2006.01)
*B60G 15/04* (2006.01)
*B60G 11/14* (2006.01)
*B60G 13/04* (2006.01)
*B60G 13/00* (2006.01)
*B60G 17/018* (2006.01)
*B60G 17/06* (2006.01)

(52) U.S. Cl.
CPC ............ *B60G 13/04* (2013.01); *B60G 15/04* (2013.01); *B60G 17/016* (2013.01); *B60G 17/018* (2013.01); *B60G 17/021* (2013.01); *B60G 17/06* (2013.01); *B60G 2202/12* (2013.01); *B60G 2202/22* (2013.01); *B60G 2204/129* (2013.01); *B60G 2204/4304* (2013.01); *B60G 2400/252* (2013.01); *B60G 2400/821* (2013.01); *B60G 2500/30* (2013.01); *B60G 2600/18* (2013.01)

(58) Field of Classification Search
CPC .. B60G 17/021; B60G 17/06; B60G 17/0272; F16F 15/03
See application file for complete search history.

(56) References Cited

U.S. PATENT DOCUMENTS

| | | | |
|---|---|---|---|
| 8,313,108 B2* | 11/2012 | Ac | B60G 17/021 280/5.5 |
| 8,833,786 B2* | 9/2014 | Camp | B62J 1/08 280/281.1 |
| 8,844,914 B2* | 9/2014 | Kim | F16F 1/361 188/267.2 |
| 9,987,897 B2* | 6/2018 | Mersmann | B60G 11/16 |
| 2018/0170139 A1* | 6/2018 | Lee | B60G 13/005 |

* cited by examiner

VEHICLE SUSPENSION APPARATUS CAPABLE OF ADJUSTING VEHICLE HEIGHT

CROSS REFERENCE TO RELATED APPLICATION

The present application claims priority to Korean Patent Application No. 10-2016-0171852, filed Dec. 15, 2016, the entire contents of which is incorporated herein for all purposes by this reference.

BACKGROUND OF THE INVENTION

Field of the Invention

The present invention relates to a vehicle suspension apparatus capable of adjusting a vehicle height according to a driving condition and surrounding circumstances.

Description of Related Art

Recently, a variety of suspension apparatuses have been developed in order to improve riding quality of a car and noise environment in a car.

Such a suspension apparatus is one of major components that is composed of a lower arm, an upper arm, a knuckle, a step-link, a spring, a shock-absorber, a ball joint, and the like to serve to connect an axle to a frame or a chassis to absorb vibration or shock transferred from the road, thereby improving riding comfort and safety of a car.

The suspension apparatus is supported by the spring, the shock-absorber, and the like to mechanically harmonize the relative motion between a vehicle body and a wheel adequately. Further, the suspension apparatus allows tires to securely adhere to the ground so as to make a car sink towards the ground when driven at high speed.

However, a problem arises in that, when driving along a speed bump or an unpaved road, if a vehicle height is low, a vehicle may be likely to collide with the road surface, and when a driving condition such as rolling, pitching or the like occurs, the vehicle may tip to one side to deteriorate riding comfort and steering performance of the vehicle.

Thus, an electronic suspension apparatus has been developed and used to electrically control a shock-absorber to automatically control a position of a vehicle. In addition, an active suspension unit employing a hydraulic system having excellent responsiveness has also been used to control vibration of a vehicle body to suit to a driving state of a vehicle, thereby obtaining stability in driving and steering of the vehicle.

However, the conventional hydraulic active suspension unit also has problems in that a hydraulic pump, a reservoir, hydraulic lines, cylinder blocks, and the like are essentially required, the implementation of the active suspension unit is complicated, the fuel efficiency of the suspension unit is low in nature, and emission of $CO_2$ is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle suspension apparatus configured for adjusting a vehicle height according to a driving condition and surrounding circumstances, improving driving performance of a vehicle.

Various aspects of the present invention are directed to providing a vehicle suspension apparatus configured for adjusting a vehicle height, the suspension apparatus including: an internal cylinder disposed on a side of a wheel and circumferentially having a plurality of fixing grooves; an intermediate cylinder rotatably provided around the internal cylinder to allow a shock-absorber to be moved up and down during rotation, the intermediate cylinder circumferentially having a plurality of connection holes corresponding to the fixing grooves; an external cylinder rotatably provided around the intermediate cylinder and having a plurality of locking pins to be inserted into the fixing grooves of the internal cylinder through the connection holes of the intermediate cylinder such that the locking pins inserted into the fixing grooves through the connection holes are decoupled from the fixing grooves, but remain inserted into the connection holes during rotation of the external cylinder; and a driving device connected to the external cylinder to, during the operation of the driving device, rotate the intermediate cylinder to allow the shock-absorber to be moved up and down, adjusting a height of a vehicle body.

The fixing grooves may be circumferentially provided at certain intervals around the internal cylinder, and the connection holes may be correspondingly provided around the intermediate cylinder at the same intervals and numbers as those of the fixing grooves.

The shock-absorber may be provided such that an upper end portion thereof is coupled to the vehicle body, and a lower end portion thereof is inserted into the intermediate cylinder, and wherein the intermediate cylinder may have an internal screw part on an internal circumferential surface thereof, and the lower end portion of the shock-absorber may have a corresponding external screw part on an external circumferential surface thereof, so that the shock-absorber is moved up and down during the rotation of the intermediate cylinder.

The driving device may include a motor fixed to the internal cylinder, and a power transmission connected between the motor and the external cylinder so that the external cylinder is rotated during the operation of the motor.

The external cylinder may be provided on an internal circumferential surface thereof with operational recesses at positions corresponding to those of the fixing grooves and the connection holes, wherein the locking pins may be respectively disposed in the operational recesses such that the locking pins are resiliently supported by elastic springs.

The operational recess may be recessed into the internal circumferential surface of the external cylinder such that a width thereof increases in a flared shape towards a bottom surface of the operational recess, and wherein the locking pin may have a base portion and a locking portion extending from the base portion so that the locking portion is inserted into the fixing groove through the connection hole, wherein the base portion is a portion that is inserted into the operational recess and a width of which increases in a flared shape towards the bottom surface of the operational recess.

The locking pin may be provided such that a width of a bottom surface of the base portion is larger than a width of an open surface of the operational recess, but is smaller than a width of the bottom surface of the operational recess.

The elastic spring may be disposed between the bottom surface of the operational recess and the base portion of the locking pin.

According to the suspension apparatus for a vehicle having the aforementioned configuration, the driving performance of a vehicle can be improved by adjusting the height of a vehicle body in response to the driving condition of a vehicle.

Further, in the case of a vehicle entering an inclined road or passing along a raised spot, the vehicle is prevented from colliding with and being damaged by the road surface.

The methods and apparatuses of the present invention have other features and advantages which will be apparent from or are set forth in more detail in the accompanying drawings, which are incorporated herein, and the following Detailed Description, which together are configured to explain certain principles of the present invention.

Figure 1:
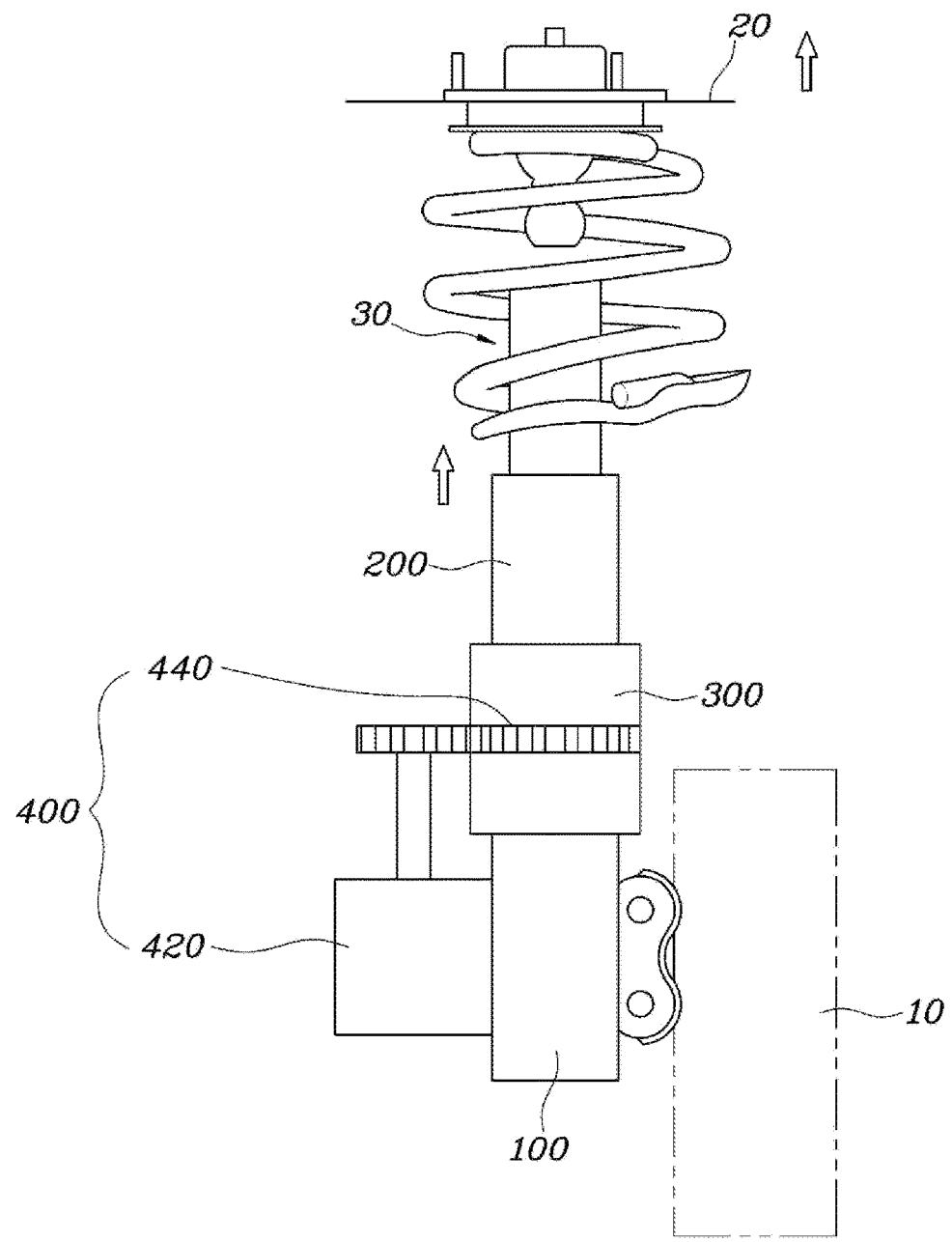
FIG. 1 is a view illustrating a vehicle suspension apparatus configured for adjusting a vehicle height according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
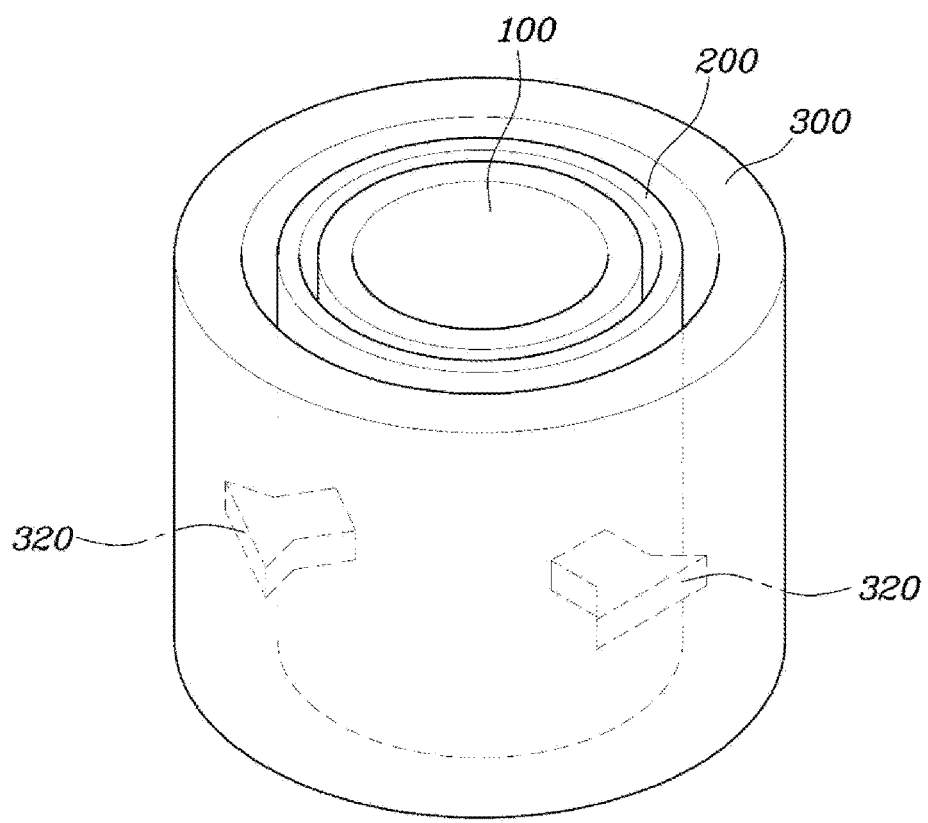
FIG. 2 is a cross-sectional view illustrating the vehicle suspension apparatus shown in FIG. 1.
Figure 3:
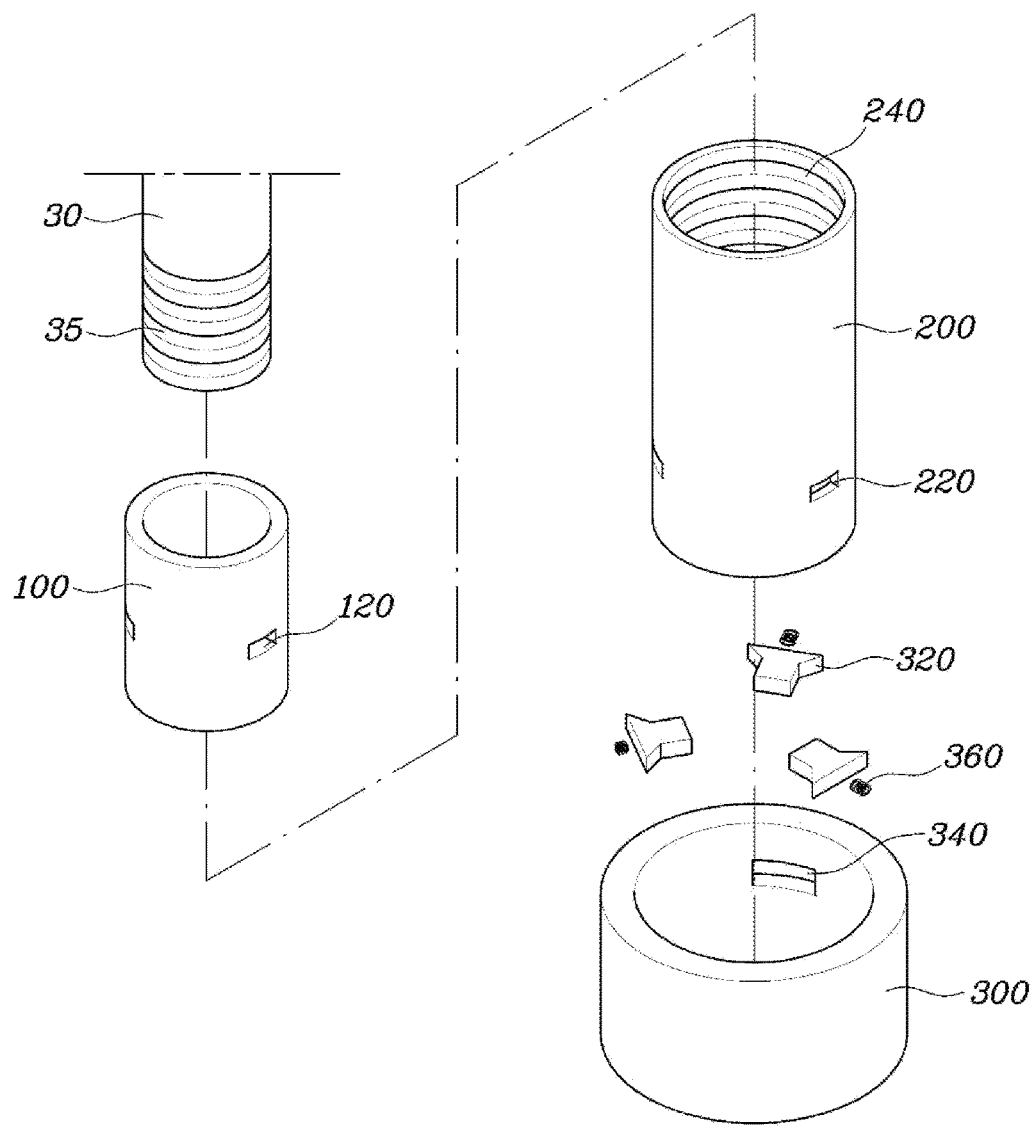
FIG. 3 is an exploded perspective view illustrating the vehicle suspension apparatus shown in FIG. 1.
Figure 4:
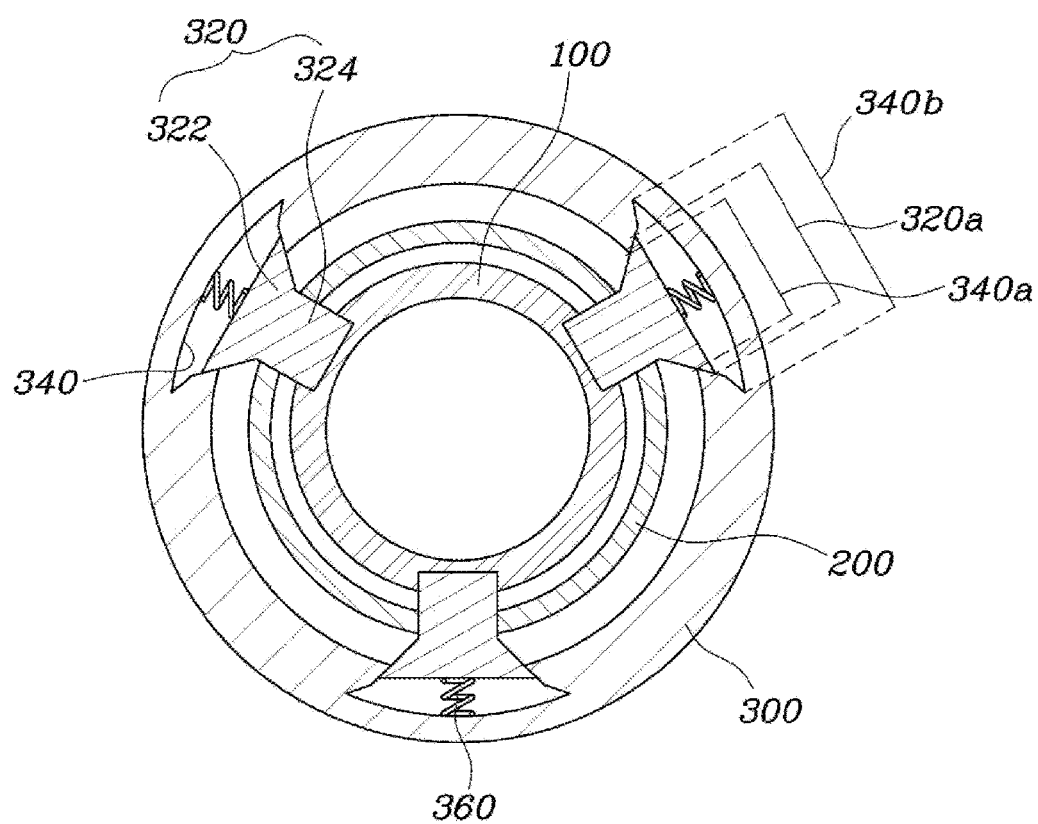
FIG. 4 and FIG. 5 are views illustrating the operation of the vehicle suspension apparatus shown in FIG. 1.
Figure 5:
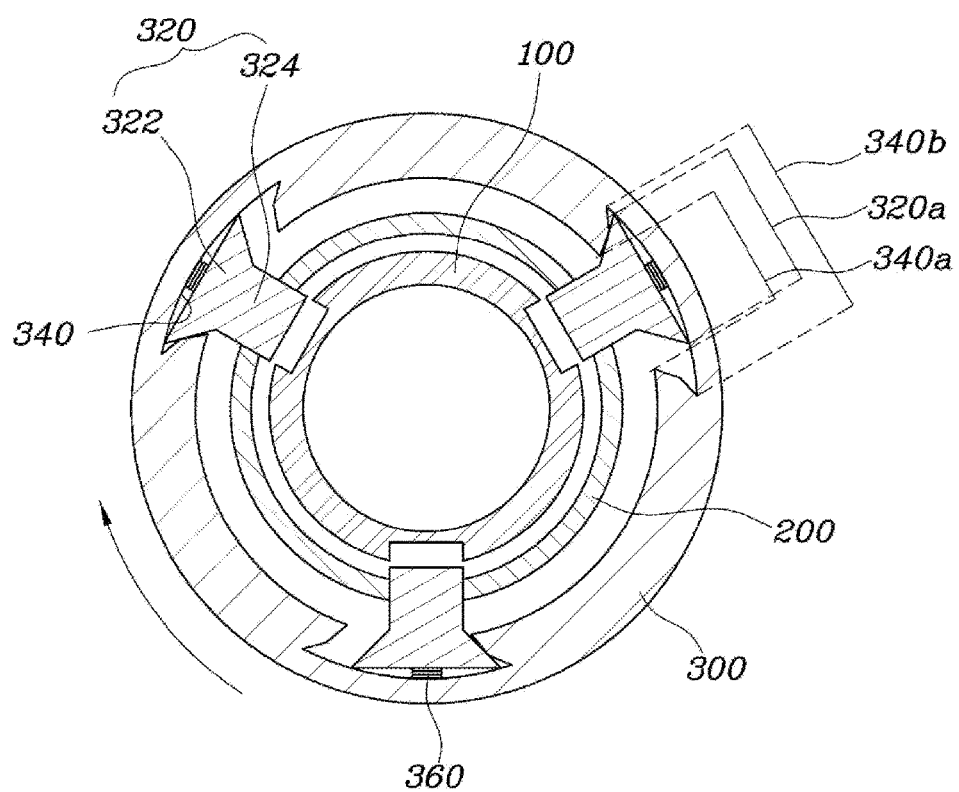

FIG. 1 is a view illustrating a vehicle suspension apparatus configured for adjusting a vehicle height according to an exemplary embodiment of the present invention, FIG. 2 is a cross-sectional view illustrating the vehicle suspension apparatus shown in FIG. 1, FIG. 3 is an exploded perspective view illustrating the vehicle suspension apparatus shown in FIG. 1, and FIG. 4 and FIG. 5 are views illustrating the operation of the vehicle suspension apparatus shown in FIG. 1.

As illustrated in FIG. 1 and FIG. 2, the vehicle suspension apparatus configured for adjusting a vehicle height according to an exemplary embodiment of the present invention may include an internal cylinder 100 disposed on a side of a wheel 10 and circumferentially having a plurality of fixing grooves 120; an intermediate cylinder 200 rotatably provided around the internal cylinder 100 to allow a shock-absorber 30 to be moved up and down during rotation, the intermediate cylinder circumferentially having a plurality of connection holes 220 corresponding to the fixing grooves 120; an external cylinder 300 rotatably provided around the intermediate cylinder 200 and having a plurality of locking pins 320 to be inserted into the fixing grooves 120 of the internal cylinder 100 through the connection holes 220 of the intermediate cylinder 200 such that the locking pins inserted into the fixing grooves through the connection holes are decoupled from the fixing grooves 120, but remain inserted into the connection holes 220 during rotation of the external cylinder; and a driving device 400 connected to the external cylinder 300 to, during the operation of the driving device, rotate the intermediate cylinder 200 to allow the shock-absorber 30 to be moved up and down, adjusting a height of a vehicle body.

The internal cylinder 100 may be a cylindrical member coupled to the side of the wheel 10, and the intermediate cylinder 200 is rotatably provided around the internal cylinder 100. Here, the shock-absorber 30 coupled to a vehicle body 20 may be integrally connected to the intermediate cylinder 200, wherein the shock-absorber 30 may have a spring-connection structure. That is, the intermediate cylinder 200 is configured to absorb vibration transferred from the wheel 10 via the shock-absorber 30. As the shock-absorber 30 is moved vertically in the internal cylinder 100, the height of the vehicle body can be controlled.

To this end, the driving device 400 for power transmission and the external cylinder 300 that is to be rotated with the power transmitted from the driving device 400 to allow the intermediate cylinder 200 to be rotated are provided. That is, when the driving device 400 operates, the external cylinder 300 is rotated with the power from the driving device, and the intermediate cylinder 200 is also rotated along with the external cylinder 300, so that the shock-absorber 30 is moved up and down.

As illustrated in FIG. 3, the shock-absorber 30 is provided such that an upper end portion thereof is coupled to the vehicle body 20 and a lower end portion thereof is inserted and fastened into the intermediate cylinder 200. In addition, the intermediate cylinder 200 has an internal screw part 240 on an internal circumferential surface thereof, and the lower end portion of the shock-absorber 30 has a corresponding external screw part 35 on an external circumferential surface thereof, so that the shock-absorber 30 can be moved up and down during the rotation of the intermediate cylinder 200.

That is, since the intermediate cylinder 200 and the shock-absorber 30 are mutually screw-coupled, during the rotation of the intermediate cylinder 200, the lower end portion of the shock-absorber 30 can be moved up and down along the internal screw part 240 of the intermediate cylinder 200. The connection between the intermediate cylinder 200 and the shock-absorber 30 is a ball-screw type connection structure in which the intermediate cylinder 200 serves as a screw nut, and the shock-absorber 30 serves as a screw shaft, allowing the shock-absorber to be moved up and down during the rotation of the intermediate cylinder 200.

Here, the driving device 400 is provided to rotate the intermediate cylinder 200 according to a driving condition and surrounding circumstances of a vehicle. The driving device 400 transmits power via the external cylinder 300 enclosing the intermediate cylinder 200. In addition, the external cylinder 300 may be connected to the intermediate cylinder 200, or to both the intermediate cylinder 200 and the internal cylinder 100 by locking pins 320.

In the meantime, the fixing grooves 120 may be circumferentially provided at certain intervals around the internal cylinder 100, and the connection holes 220 may be correspondingly provided around the intermediate cylinder 200 at the same intervals and numbers as those of the fixing grooves 120. In this way, the fixing grooves 120 and the connection holes 220 are respectively provided around the internal cylinder 100 and the intermediate cylinder 200 such that the rotating intermediate cylinder 200 can be fixed at various positions by the locking pins 320 being inserted therethrough.

The locking pins 320 to be inserted into the fixing grooves 120 through the connection holes 220 are inserted into the external cylinder 300. When the locking pins 320 are inserted into the fixing grooves 120 of the internal cylinder 100 through the connection holes 220 of the intermediate cylinder 200, the rotation of the intermediate cylinder 200 is prevented. Then, when the external cylinder 300 is rotated in response to the power transmitted from the driving device 400, the locking pins 320 are decoupled from the fixing grooves 120, but remain inserted into the connection holes 220 of the intermediate cylinder 200, so that the intermediate cylinder 200 is rotated along with the external cylinder 300.

In this way, when the external cylinder 300 is rotated in response to the power transmitted from the driving device 400, the locking pins 320 inserted into the external cylinder 300 are locked through the intermediate cylinder 200 so that the external cylinder 300 and the intermediate cylinder 200 are rotated together in the same direction, and then the shock-absorber 30 connected to the intermediate cylinder 200 is rotated up and down according to the rotation of the intermediate cylinder 200, adjusting the height of the vehicle body.

In the meantime, as illustrated in FIG. 1, the driving device 400 may include a motor 420 fixed to the internal cylinder 100, and a power transmission 440 that is connected between the motor 420 and the external cylinder 300 so that the external cylinder 300 is rotated during the operation of the motor 420.

Here, the motor 420 of the driving device 400 may be operated under the control of an Electronic Control Unit (ECU) of a vehicle, and the power transmission 440 may transmit power from the motor 420 via a gear connection mechanism or a chain connection mechanism. The motor 420 has an operational rotor gear part and the power transmission 440 has a gear part meshed with the circumference of the external cylinder 300, so that as the motor 420 and the power transmission 440 are mutually meshed with each other, the external cylinder is rotated along with the power transmission 440 during the operation of the motor 420.

In the meantime, as illustrated in FIG. 2 and FIG. 3, the external cylinder 300 may be provided on an internal circumferential surface thereof with operational recesses 340 at positions corresponding to those of the fixing grooves 120 and the connection holes 220. The locking pins 320 may be respectively disposed in the operational recesses 340 such that the locking pins can be resiliently supported by elastic springs 360. Here, the elastic spring 360 may be disposed between a bottom surface 340b of the operational recess 340 to be described later and a base portion 322 of the locking pin 320.

That is, the external cylinder 300 is provided with the operational recesses 340 on the internal circumferential surface, and the locking pins 320 are respectively disposed in the operational recesses 340 with the elastic springs 360 interposed therebetween, so that the locking pins 320 protrude towards the intermediate cylinder 200 and the internal cylinder 100. Thus, when the locking pins 320 provided in the external cylinder 300 are inserted into the fixing grooves 120 of the internal cylinder 100 through the connection holes 220 of the intermediate cylinder 200, the intermediate cylinder 200 and the external cylinder 300 are connected to the internal cylinder 100 fixed to the side of the wheel 10 by the locking pins 320, so that they are prevented from being rotated. In addition, since the locking pins 320 are resiliently supported by the elastic springs 360, when the external cylinder 300 is rotated to positions corresponding to those of the fixing grooves 120 of the internal cylinder 100, the locking pins 320 can be naturally inserted into the fixing grooves 120.

Specifically, as illustrated in FIG. 4, the operational recess 340 may be recessed into the internal circumferential surface of the external cylinder 300 such that a width thereof increases in a flared shape towards the bottom surface of the operational recess. In addition, the locking pin 320 may have a base portion 322 and a locking portion 324 that extends from the base portion 322 so that it is inserted into the fixing groove 120 through the connection hole 220, wherein the base portion 322 is a portion that is inserted into the operational recess 340 and has a width that increases in a flared shape towards the bottom surface of the operational recess 340.

In this way, the operational recess 340 has the flared shape in the internal circumferential surface of the external cylinder 300, and the base portion 322 of the locking pin 320 also has the flared shape to be inserted into the operational recess 340. Thus, the flared base portion 322 of the locking pin 320 is inserted into the flared operational recess 340, so that the locking pin cannot be completely decoupled from the operational recess 340. Further, the locking portion 324 extends from the base portion 322 to be inserted into the fixing groove 120 through the connection hole 220, so that the intermediate cylinder 200 can or cannot be rotated along with the external cylinder 300 in response to the locking portion 324 being inserted into or decoupled from the fixing groove 120 of the internal cylinder 100.

The locking pin 320 may be provided such that a bottom surface 320a of the base portion 322 has a width that is larger than that of an open surface 340a of the operational recess 340, but is smaller than that of the bottom surface 340b of the operational recess 340. That is, since the base portion 322 of the locking pin 320 is flared so that the width of the bottom surface 320a thereof is larger than the width of the open surface 340a of the flared operational recess 340, the base portion 322 is locked in and is not decoupled from the operational recess 340.

However, since the locking pin 320 needs to be decoupled from the fixing groove 120 of the internal cylinder 100 during the rotation of the external cylinder 300, the base portion 322 of the locking pin 320 needs to be configured such that the width of the bottom surface 320a is smaller than the width of the bottom surface 340b of the flared operational recess 340. That is, the base portion 322 of the locking pin 320 and the operational recess 340 have the flared shape in which the width of the bottom surface 320a of the base portion 322 is smaller than the width of the bottom surface 340b of the flared operational recess 340 so that the bottom surface of the operational recess 340 is wider than the bottom surface of the base portion 322. Thus, the base portion 322 of the locking pin 320 can be moved in the operational recess 340 without being completely decoupled therefrom.

Then, when the external cylinder is rotated in a state of the locking portions 324 of the locking pins 320 being locked into the fixing grooves 20 of the internal cylinder 100, the flared shapes of the operational recesses 340 push down the flared shapes of the base portions 322 so that the locking pins 320 are moved towards the operational recesses 340 to allow the locking portions 324 to be decoupled from the fixing grooves 120. Further, as the base portions 322 are brought into contact with the bottom surface 340b of the operational recess 340, the locking pins 320 decoupled from the fixing grooves 120 of the internal cylinder 100 are decoupled from the fixing grooves 120, but remain inserted into the connection holes 220 of the intermediate cylinder 200. Thus, during the rotation of the external cylinder 300, the intermediate cylinder 200 is also rotated by the locking pins 320, so that the shock-absorber 30 screw-coupled to the intermediate cylinder 200 can be moved up and down.

Now, the operation of the suspension apparatus for a vehicle according to an exemplary embodiment of the present invention will be described.

As illustrated in FIG. 4, where the height of a vehicle body is fixed, the locking pins 320 provided in the external cylinder 300 are inserted into the fixing grooves 120 of the internal cylinder 100 through the connection holes 220 of the intermediate cylinder 200, preventing the rotation of the intermediate cylinder 200. That is, since the intermediate cylinder 200 is prevented from being rotated by the locking pins 320, the shock-absorber 30 coupled to the side of the vehicle body 20 is also prevented from being moved up and down, so that the height of the vehicle body cannot be changed.

Here, as illustrated in FIG. 5, the height of the vehicle body can be regulated by rotating the external cylinder 300 with the operation of the driving device 400. Here, since the locking pins 320 provided in the external cylinder 300 are rotated along with the external cylinder 300 in a state in which the base portions 322 of the locking pins 320 are being inserted into the operational recesses 340 and the locking portions 324 are being connected into the fixing grooves 322, the operational recesses 340 of the external cylinder 300 push down the base portions 322 of the locking pins 320. That is, during the rotation of the external cylinder 300 in a state of the locking portions 324 of the locking pins 320 being locked into the fixing grooves 120 of the internal cylinder 100, the flared shapes of the operational recesses 340 push down the flared base portions 322, so that the locking pins 320 are moved towards the bottom surfaces of the operational recesses 340 to allow the locking portions 324 to be decoupled from the fixing grooves 120. Thus, since the locking pin 320 is in a state in which the base portion 322 comes into contact with the bottom surface 340b of the operational recess 340 and the locking portion 324 is decoupled from the fixing groove 120, but remains inserted into the connection hole 220 of the intermediate cylinder 200, the intermediate cylinder 200 is rotated along with the external cylinder 300 in the same direction.

Thus, the shock-absorber 30 inserted into the intermediate cylinder 200 is rotated up and down along the internal screw part 240 of the intermediate cylinder 200, which allows the height of the vehicle body 20 to be adjusted. For example, the height of the vehicle body may increase or decrease according to the positive-rotational operation or negative-rotational operation of the driving device 400, respectively.

According to the vehicle suspension apparatus having the aforementioned configuration, the driving performance of a vehicle can be improved by adjusting the height of a vehicle body in response to the driving condition of a vehicle.

Further, in the case of a vehicle entering an inclined road or passing along a raised spot, the vehicle is prevented from colliding with and being damaged by the road surface.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle suspension apparatus for adjusting a vehicle height, the suspension apparatus comprising:
   an internal cylinder disposed on a side of a wheel and circumferentially having a plurality of fixing grooves;
   an intermediate cylinder rotatably provided around the internal cylinder to allow a shock-absorber to be moved up and down during rotation, the intermediate cylinder circumferentially having a plurality of connection holes corresponding to the fixing grooves;
   an external cylinder rotatably provided around the intermediate cylinder and having a plurality of locking pins to be inserted into the fixing grooves of the internal cylinder through the connection holes of the intermediate cylinder, and wherein the locking pins inserted into the fixing grooves through the connection holes are decoupled from the fixing grooves, but continue inserted into the connection holes during rotation of the external cylinder; and
   a driving device connected to the external cylinder to, during an operation of the driving device, rotate the intermediate cylinder to allow the shock-absorber to be moved up and down, adjusting a height of a vehicle body.

2. The vehicle suspension apparatus according to claim 1, wherein the fixing grooves are circumferentially provided at predetermined intervals around the internal cylinder, and the connection holes are correspondingly provided around the intermediate cylinder at same intervals and numbers as those of the fixing grooves.

3. The vehicle suspension apparatus according to claim 1, wherein the shock-absorber is provided, and wherein an upper end portion thereof is coupled to the vehicle body, and a lower end portion thereof is configured to be inserted into the intermediate cylinder, and wherein the intermediate cylinder has an internal screw part on an internal circumferential surface thereof, and the lower end portion of the shock-absorber has a corresponding external screw part on an external circumferential surface thereof, wherein the shock-absorber is configured to be moved up and down during the rotation of the intermediate cylinder.

4. The vehicle suspension apparatus according to claim 1, wherein the driving device includes a motor fixed to the internal cylinder, and a power transmission connected between the motor and the external cylinder wherein the external cylinder is rotated during the operation of the motor.

5. The vehicle suspension apparatus according to claim 1, wherein the external cylinder is provided on an internal circumferential surface thereof with operational recesses at positions corresponding to those of the fixing grooves and the connection holes, wherein the locking pins are respectively disposed in the operational recesses, and wherein the locking pins are resiliently supported by elastic members.

6. The vehicle suspension apparatus according to claim 5, wherein the operational recess is recessed into the internal circumferential surface of the external cylinder, and wherein a width thereof increases in a flared shape towards a bottom surface of the operational recess, and wherein the locking pins have a base portion and a locking portion extending from the base portion wherein the locking portion is configured to be inserted into the fixing groove through the connection hole, wherein the base portion is a portion that is configured to be inserted into the operational recess and a width of which increases in a flared shape towards the bottom surface of the operational recess.

7. The vehicle suspension apparatus according to claim 6, wherein the locking pins are provided, and wherein a width of a bottom surface of the base portion is larger than a width of an open surface of the operational recess, but is smaller than a width of the bottom surface of the operational recess.

8. The vehicle suspension apparatus according to claim 6, wherein the elastic members are disposed between the bottom surface of the operational recess and the base portion of the locking pins.

\* \* \* \* \*